United States Patent
Gebke et al.

(10) Patent No.: US 6,363,710 B1
(45) Date of Patent: Apr. 2, 2002

(54) GAS AND STEAM-TURBINE PLANT

(75) Inventors: Klaus Gebke, Gelnhausen; Thomas Greis, Darmstadt; Hans-Joachim Thiel, Erlangen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/707,016

(22) Filed: Nov. 6, 2000

Related U.S. Application Data

(63) Continuation of application No. PCT/DE99/01264, filed on Apr. 29, 1999.

(30) Foreign Application Priority Data

May 6, 1998 (DE) .......................................... 198 20 196

(51) Int. Cl.⁷ ................................................ F02C 6/18
(52) U.S. Cl. ................................... 60/39.182; 60/39.75
(58) Field of Search ............................ 60/39.182, 39.75

(56) References Cited

U.S. PATENT DOCUMENTS

| | | | |
|---|---|---|---|
| 5,490,377 A | | 2/1996 | Janes |
| 5,491,971 A | * | 2/1996 | Tomlinson ............... 60/39.182 |
| 6,018,942 A | * | 2/2000 | Liebig ........................ 60/39.75 |
| 6,145,295 A | * | 11/2000 | Donovan et al. .......... 60/39.75 |

OTHER PUBLICATIONS

Japanese Patent Abstract No. 560565949 (Yoshio), dated May 18, 1981.

* cited by examiner

*Primary Examiner*—Louis J. Casaregola
(74) *Attorney, Agent, or Firm*—Herbert L. Lerner; Laurence A. Greenberg; Werner H. Stemer

(57) ABSTRACT

A gas and steam-turbine plant having a heat-recovery steam generator which is connected downstream of a gas turbine on a flue-gas side is described. The heat-recovery steam generator has heating surfaces connected in a water/steam circuit of a steam turbine. Cooled air for cooling the blades can be directed via an evaporator to the gas turbine. The evaporator is connected on a secondary side to the water/steam circuit and opens on an outlet side into a steam-collecting chamber. The steam-collecting chamber is connected to a water/steam drum via feed pipes connected in parallel on a steam side. The intention is to ensure that, during the transport of the water/steam mixture from the evaporator to the water/steam drum, a separation of the two-phase mixture is reliably prevented. Therefore, the steam-collecting chamber has a number of sub-chambers, which are connected to one another and in each case assigned to a feed pipe.

3 Claims, 2 Drawing Sheets

GAS AND STEAM-TURBINE PLANT

CROSS-REFERENCE TO RELATED APPLICATION

This is a continuation of copending International Application PCT/DE99/01264, filed Apr. 29, 1999, which designated the United States.

BACKGROUND OF THE INVENTION

FIELD OF THE INVENTION

The invention relates to a gas and steam-turbine plant having a heat-recovery steam generator which is connected downstream of a gas turbine on a flue-gas side and heating surfaces of which are connected in a water/steam circuit of a steam turbine.

In a gas and steam-turbine plant, the heat contained in the expanded working medium or flue gas of the gas turbine is utilized to generate steam for a steam turbine. The heat transfer is effected in the heat-recovery steam generator which is connected downstream of the gas turbine on the flue-gas side and in which heating surfaces in the form of tubes or banks of tubes are disposed. The latter in turn are connected in a water/steam circuit of the steam turbine. The water/steam circuit normally contains a plurality of pressure stages, for example two pressure stages, each pressure stage having a preheating and an evaporating heating surface.

It is normally necessary to cool the blades of the gas turbine of the gas-turbine plant. This is particularly the case when the blades are subjected to especially high thermal loading on account of inlet temperatures of a working medium in the gas turbine.

For cooling the blades, air may be extracted downstream of the air compressor of the gas-turbine plant. Due to the compression of the air in the air compressor, the air is heated to a high degree. Therefore cooling of the extracted compressor air may be necessary in order to ensure sufficient cooling of the blades of the gas turbine. A heat exchanger, to which the compressed air is admitted as a heating medium, may be provided for the cooling. On a secondary side, the heat exchanger may be configured as an evaporator, which is connected to the water/steam circuit of the steam turbine in order to recover the heat contained in the compressed air.

However, during the transport of the water/steam mixture from the evaporator to the heat-recovery steam generator, care should be taken to ensure that no separation of the two phases occurs. This is because back flows of the condensate may occur in the event of a phase separation. The back flows may cause condensation shocks in the lines and may thus lead to undesirable damage to the components.

SUMMARY OF THE INVENTION

It is accordingly an object of the invention to provide a gas and steam-turbine plant which overcomes the above-mentioned disadvantages of the prior art devices of this general type, in which, with especially little technical outlay, a separation of the two phases during the transport of the water/steam mixture from the evaporator to the heat-recovery steam generator is avoided in a reliable manner.

With the foregoing and other objects in view there is provided, in accordance with the invention, a gas and steam-turbine plant. The turbine plant contains a gas turbine having blades, a steam turbine, a water/steam circuit connected to the steam turbine, and a heat-recovery steam generator connected downstream of the gas turbine on a flue-gas side. The heat-recovery steam generator has heating surfaces connected in the water/steam circuit to the steam turbine. A steam collecting chamber having a number of sub-chambers connected to one another is provided. The sub-chambers are formed by a configuration of a number of bulkhead plates subdividing the steam collecting chamber. The turbine plant further has a water/steam drum and a plurality of feed pipes disposed in parallel on a steam side connecting the water/steam drum to the steam collecting chamber. Each of the sub-chambers of the steam collecting chamber are connected to one of the feed pipes. Additionally, the turbine plant has an evaporator connected to the gas turbine for feeding cooled air to the blades of the gas turbine for cooling the blades. The evaporator receives air as a heating medium and the evaporator cools the air resulting in the cooled air. The evaporator has a secondary side connected to the water/steam circuit and opens on an outlet side into the steam-collecting chamber.

For the gas and steam-turbine plant of the above-mentioned type, the object is achieved according to the invention by feeding air, being a heating medium, to the evaporator in which the air is cooled and then fed to the blades of the gas turbine for cooling the blades. The evaporator is connected on the secondary side to the water/steam circuit and in the process opens on the outlet side into a steam-collecting chamber, which is connected to a water/steam drum via a number of feed pipes connected in parallel on the steam side. The steam-collecting chamber has a number of sub-chambers, which are connected to one another and of which each is in each case assigned to a feed pipe. A number of bulkhead plates are advantageously disposed in the steam-collecting chamber in order to form the sub-chambers connected to one another. In this configuration, especially uniform feeding of the water/steam mixture located in the steam-collecting chamber to the individual feed pipes is ensured.

The invention is based on the idea that a separation of the two phases will not occur if, depending on the pressure, the flow velocity of the water/steam mixture does not fall below a certain value. In the process, the minimum velocity of the two-phase mixture, below which a phase separation may occur, depends on an inside diameter of the pipe through which the flow occurs. In this case, although a comparatively small inside diameter permits a comparatively high flow velocity without a phase separation occurring, it also limits the rate of flow through the feed pipe. In order to meet both requirements, a number of feed pipes having a comparatively small inside diameter are connected in parallel. In this case, a uniform admission to the feed pipes should be ensured. The uniform admission of steam to the feed pipes is ensured when approximately the same quantity of steam is assigned to each feed pipe and approximately the same steam pressure prevails in the region of the steam-collecting chamber that opens into the feed pipes. To this end, the steam-collecting chamber has a number of sub-chambers, which are connected to one another and to which in each case a feed pipe is assigned.

As extensive tests have shown, a flow velocity of the water/steam mixture of 35 m/s proves to be an especially favorable limit below which the flow velocity should not fall. This is because the pressure loss, the risk of erosion and corrosion and reliable prevention of the phase separation are in an especially balanced relationship to one another above this value. The feed pipes are therefore advantageously configured with regard to their number and their inside diameter $d_i$ in such a way that, under all operating states of the plant, a flow velocity of the water/steam mixture flowing in them does not fall below 35 m/s.

The water/steam drum, for forming a circulation, is expediently connected on the inlet side and outlet side to an evaporator heating surface, which is disposed in the heat-recovery steam generator.

The advantages achieved with the invention relate in particular to the fact that, due to the parallel connection of the feed pipes, in which the sub-chamber of the steam-collecting chamber is assigned in each case to each feed pipe, a separation of the two phases of the water/steam mixture during the transport from the evaporator to the heat-recovery steam generator is prevented in an especially reliable manner. As a result, damage to corresponding components is reliably avoided, so that the gas and steam-turbine plant has an especially long service life. In addition, feedback of the heat energy contained in the air provided for cooling the blades into the steam-generating process of the plant is ensured in an especially favorable manner.

Other features which are considered as characteristic for the invention are set forth in the appended claims.

Although the invention is illustrated and described herein as embodied in a gas and steam-turbine plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
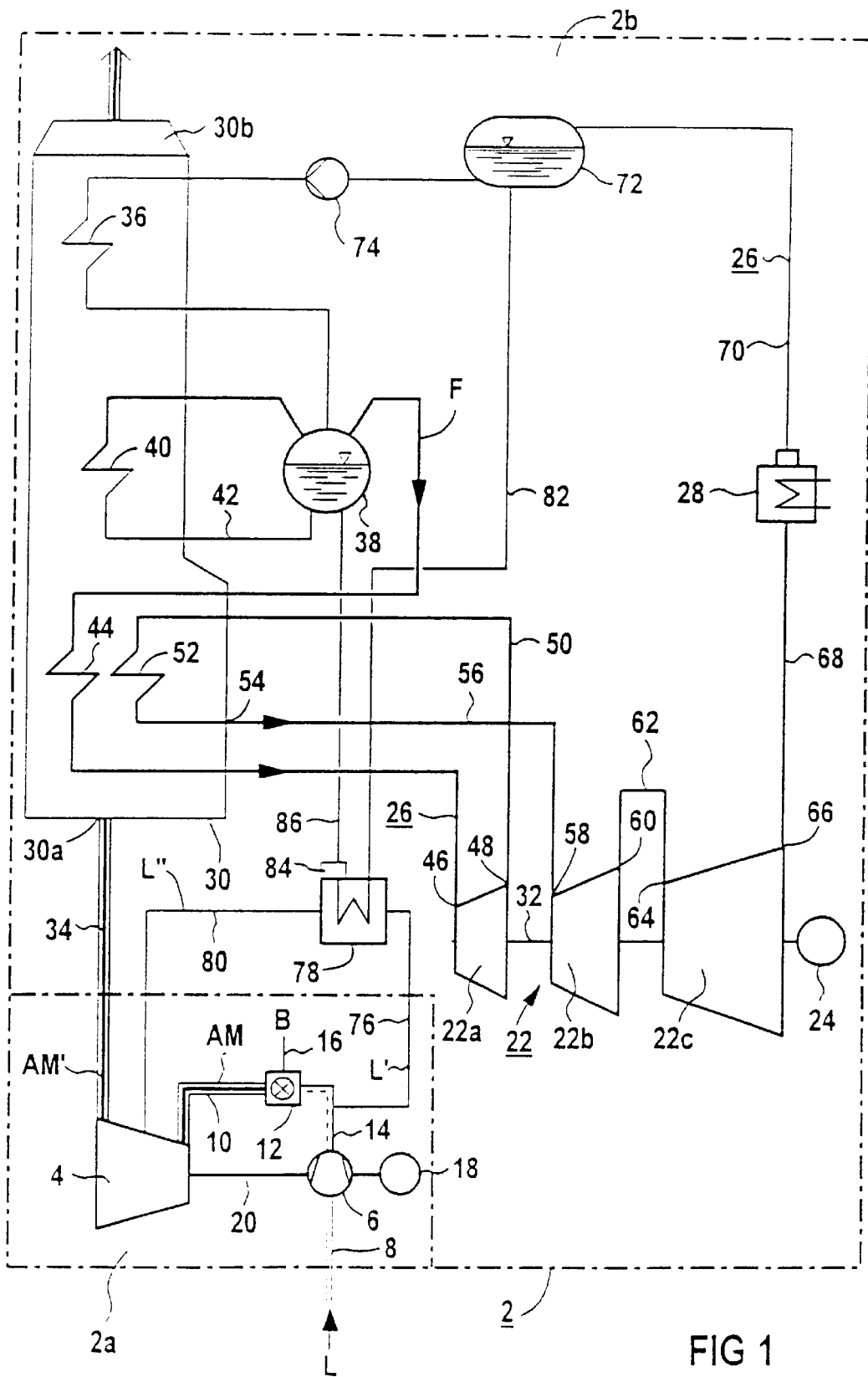
FIG. 1 is a diagrammatic, illustration of a gas and steam-turbine plant.

In all the figures of the drawing, sub-features and integral parts that correspond to one another bear the same reference symbol in each case. Referring now to the figures of the drawing in detail and first, particularly, to FIG. 1 thereof, there is shown schematically a gas and steam-turbine plant 2 that contains a gas-turbine plant 2a and a steam-turbine plant 2b. The gas-turbine plant 2a contains a gas turbine 4 with a coupled air compressor 6. The air compressor 6 is connected on an inlet side to an intake-air line 8 provided for air L. A combustion chamber 12 is connected upstream of the gas turbine 4 via a feed line 10 provided for a working medium AM and is connected to a fresh-air line 14 of the air compressor 6. A fuel line 16 provided for fuel B opens into the combustion chamber 12 of the gas turbine 4. The gas turbine 4 and the air compressor 6 as well as a generator 18 sit on a common shaft 20.

The steam-turbine plant 2b contains a steam turbine 22 coupled with a generator 24 and, in a water/steam circuit 26, a condenser 28, connected downstream of the steam turbine 22, and also a heat-recovery steam generator 30. The steam turbine 22 consists of a first pressure stage or a high-pressure part 22a, a second pressure stage or an intermediate-pressure part 22b, and also a third pressure stage or a low-pressure part 22c, which drive the generator 24 via a common shaft 32.

To feed a working medium AM' or flue gas expanded in the gas turbine 4 into the heat-recovery steam generator 30, an exhaust-gas line 34 is connected to an inlet 30a of the heat-recovery steam generator 30. The expanded working medium AM' from the gas turbine 4 leaves the heat-recovery steam generator 30 via its outlet 30b in the direction of a stack (not shown in any more detail).

In a first pressure stage or high-pressure stage of the water/steam circuit 26, the heat-recovery steam generator 30 contains a high-pressure preheater or economizer 36, which is connected to a water/steam drum 38. The water/steam drum 38 is connected to an evaporator heating surface 40, disposed in the heat-recovery steam generator 30, for forming a water/steam circulation 42. To discharge live steam F, the high-pressure drum 38 is connected to a high-pressure superheater 44, which is disposed in the heat-recovery steam generator 30 and is connected on an outlet side to a steam inlet 46 of the high-pressure part 22a of the steam turbine 22.

A steam outlet 48 of the high-pressure part 22a of the steam turbine 22 is connected via a steam line 50 ("cold reheating") to a reheater 52. An outlet 54 of the reheater 52 is connected via a steam line 56 to a steam inlet 58 of the intermediate-pressure part 22b of the steam turbine 22. A steam outlet 60 of the intermediate-pressure part 22b is connected via an overflow line 62 to a steam inlet 64 of the low-pressure part 22c Of the steam turbine 22. A steam outlet 66 of the low-pressure part 22c of the steam turbine 22 is connected via a steam line 68 to the condenser 28. The latter, via a feedwater line 70, in which a feedwater tank 72 and a feedwater pump 74 are connected, is connected to the economizer 36 in such a way that a closed water/steam circuit 26 results.

In the exemplary embodiment according to FIG. 1, therefore, only the first pressure stage of the water/steam circuit 26 is shown in detail. However, further heating surfaces (not shown in any more detail), which are in each case assigned to an intermediate-pressure stage or a low-pressure stage of the water/steam circuit 26, are disposed in the heat-recovery steam generator 30. These heating surfaces are connected in a suitable manner to the steam inlet 58 of the intermediate-pressure part 22b of the steam turbine 22 or to the steam inlet 60 of the low-pressure part 22c of the steam turbine 22.

The gas turbine 4 of the gas-turbine plant 2a is provided with blade cooling. In this case, cooling air L" can be fed to the blades of the gas turbine 4 to be cooled. To this end, an air line 76 provided for compressed air L' branches off from the fresh-air line 14 of the air compressor 6 and opens into an evaporator 78. The evaporator 78 is connected on an outlet side to the gas turbine 4 via a cooling-air line 80.

On a secondary side, the evaporator 78 is connected to the water/steam circuit 26 of the steam-turbine plant 2b. To this end, the evaporator 78 is connected on an inlet side to the feedwater tank 72 via a feed line 82. On an outlet side, a steam-collecting chamber 84 is connected downstream of the evaporator 78, the steam-collecting chamber 84 being connected to the water/steam drum 38 via a number of feed pipes 86.

Figure 2:
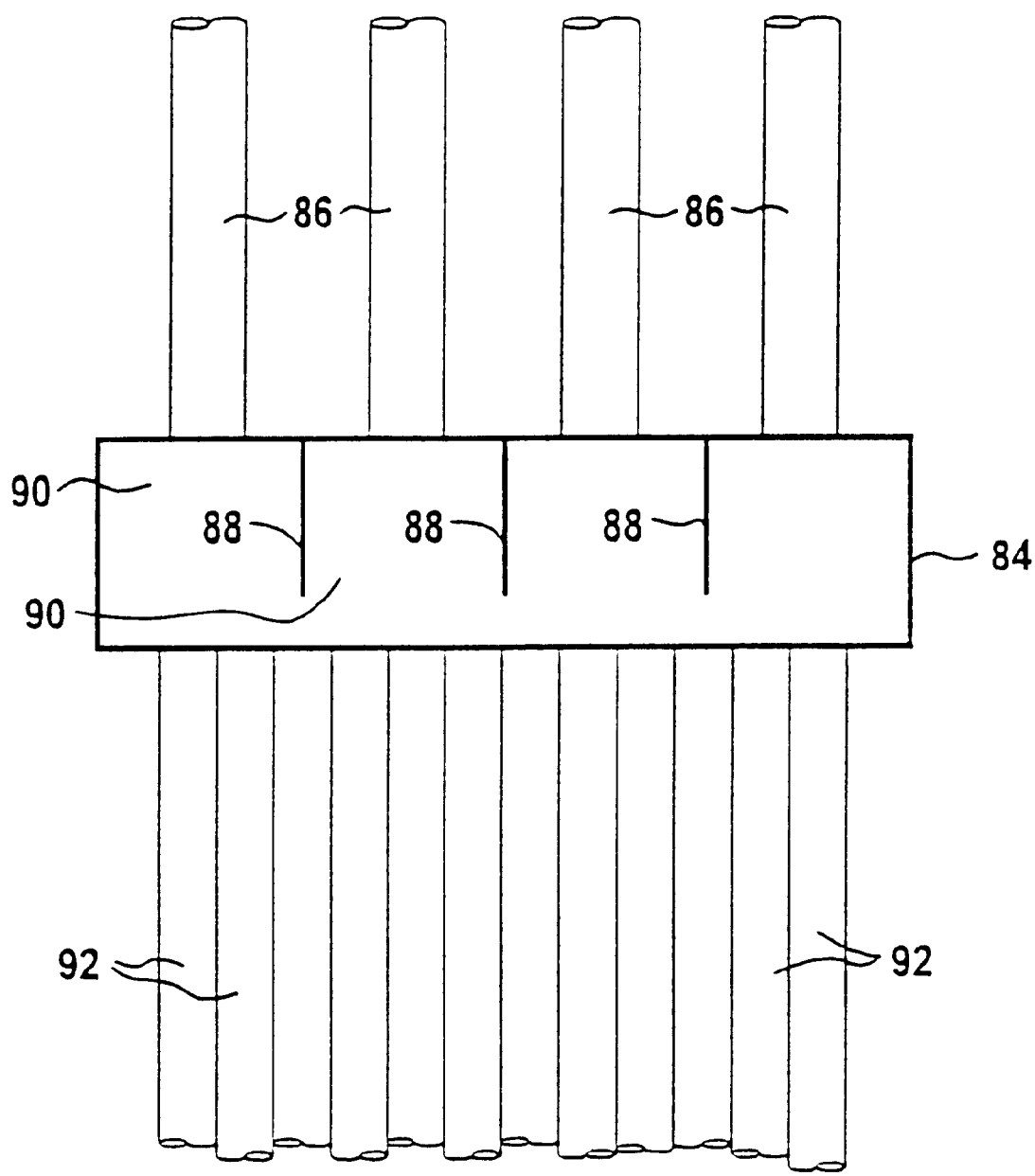
FIG. 2 is a diagrammatic illustration of a steam-collecting chamber according to FIG. 1.

The steam-collecting chamber 84 shown in detail in FIG. 2 is subdivided by bulkhead plates 88 into a number of sub-chambers 90 connected to one another. The steam-collecting chamber 84 is connected on an inlet side to a number of evaporator tubes 92 of the evaporator 78. On an outlet side, the steam-collecting chamber 84 is connected to a number of the feed pipes 86. In this case, one of the feed pipes 86 is assigned in each case to each of the sub-chambers 90 of the steam-collecting chamber 84.

The air L required for cooling the blades of the gas turbine 4 is fed to the air compressor 6 via the intake-air line 8 and can be extracted from the fresh-air line 14 on the outlet side downstream of the air compressor 6. However, the compressed air L' is at too high a temperature for cooling the blades. Therefore cooling of the compressed air L' is necessary. This is effected in the evaporator 78. The cooled air L" can be fed via the air line 80 to the gas turbine 4 for cooling the blades.

The heat produced during the cooling of the air can be fed to the water/steam circuit 26 of the steam-turbine plant 2b. For this purpose, feedwater is directed from the feedwater tank 72 to the evaporator 78 via the water line 82. The feedwater is partly evaporated by the cooling of the compressed air L' in the evaporator 78. The water/steam mixture produced in the evaporator 78 in the process is fed to the water/steam drum 38 via a number of feed pipes 86. So that no separation of the two-phase water/steam mixture occurs during the transport of the same from the evaporator 78 into the water/steam drum 38, the feed pipes 86 have a pipe inside diameter $d_i$ which ensures that the flow velocity of the two-phase mixture does not fall below 35 m/s. In addition, the steam-collecting chamber 84 is connected between the feed pipes 86 and the evaporator 78.

The steam-collecting chamber 84 is subdivided by the bulkhead plates 88 into a number of the sub-chambers 90, which are connected to one another and which all have approximately the same steam pressure. The sub-chambers 90 are each assigned to a feed pipe 86. As a result, especially uniform admission of the water/steam mixture to the feed pipes 86 is ensured.

With especially little technical outlay, the interposition of the steam-collecting chamber 84 between the feed pipes 86 and the evaporator 78 ensures that no separation of the two-phase water/steam mixture occurs during the transport of the same from the evaporator 78 to the water/steam drum 38. The gas and steam-turbine plant 2 therefore has an especially long service life, since damage to the individual components is avoided in an especially reliable manner. In addition, utilization of the waste heat produced in the plant is ensured in a particularly favorable manner.

I claim:

1. A gas and steam-turbine plant, comprising:
   a gas turbine having blades;
   a steam turbine;
   a water/steam circuit connected to said steam turbine;
   a heat-recovery steam generator connected downstream of said gas turbine on a flue-gas side, said heat-recovery steam generator having heating surfaces connected in said water/steam circuit to said steam turbine;
   a steam collecting chamber having a number of sub-chambers connected to one another, said sub-chambers formed by a configuration of a number of bulkhead plates;
   a water/steam drum;
   a plurality of feed pipes disposed in parallel on a steam side connecting said water/steam drum to said steam collecting chamber, each of said sub-chambers of said steam collecting chamber connected to one of said feed pipes; and
   an evaporator disposed external to said heat-recovery steam generator and connected to said gas turbine for feeding cooled air to said blades of said gas turbine for cooling said blades, said evaporator having an inlet for receiving air as a heating medium and said evaporator cooling said air resulting in the cooled air, said evaporator having a secondary side connected to said water/steam circuit and open on an outlet side into said steam-collecting chamber.

2. The gas and steam-turbine plant according to claim 1, wherein said feed pipes have an inside diameter, and the number of said feed pipes and a dimensioning of said inside diameter are chosen such that, under all operating states of the gas and steam-turbine plant, a water/steam mixture flowing in said feed pipes does not fall below a flow velocity of 35 m/s.

3. The gas and steam-turbine plant according to claim 1, wherein said heat-recovery system has an evaporator heating surface connected to said water/steam drum and together form a water/steam circulation system.

* * * * *